United States Patent [19]

Pertzsch et al.

[11] Patent Number: 4,602,303
[45] Date of Patent: Jul. 22, 1986

[54] COVER FOR THE LIGHT CHANNEL FOR A DEVICE FOR SWITCHING-OFF A MAGNETIC CASSETTE TAPE AT THE END OF ITS RUN

[75] Inventors: Albert Pertzsch; August Liepold, both of Munich; Hubert Brunner, Weil; Ludwig Zeroni, Ottobrunn, all of Fed. Rep. of Germany

[73] Assignee: Agfa Gevaert Aktiengesellschaft, Leverkusen, Fed. Rep. of Germany

[21] Appl. No.: 726,664

[22] Filed: Apr. 24, 1985

[30] Foreign Application Priority Data

May 4, 1984 [DE] Fed. Rep. of Germany ....... 3416481

[51] Int. Cl.$^4$ .............................................. G11B 23/06
[52] U.S. Cl. .................................... 360/74.6; 360/132
[58] Field of Search ............................. 360/74.6, 132

[56] References Cited

U.S. PATENT DOCUMENTS 4,012,011  3/1977  Saito ..................................... 242/199

Primary Examiner—George G. Stellar
Attorney, Agent, or Firm—Connolly and Hutz

[57] ABSTRACT

A cover for the light channel for a device for switching-off at the end of its run a magnetic cassette tape with a transparent leader tape, an opening being provided in the bottom part of the cassette for accommodating the light, the opening being defined by a one- or two-part light shaft having slotted light channels for the passage of the beams of light towards the light-receiving elements on the side of the device, the light shaft 5 located only in the bottom part of the cassette being provided with an encircling ledge 8 below the light channels, 6, 7 on which ledge a flexible piece of film 9 rests which is transparent at least in the region of the light channels, or the light shaft, which is divided in the middle and fills out the height of the interior of the cassette housing, has an encircling ledge 8, 10 in each of the top and bottom parts 5, 5 a thereof, outside the region of the light channels, between which a flexible transparent piece of film 12 covering the light channels rests, the piece of film being supported on the inside wall of the light shaft.

3 Claims, 5 Drawing Figures

COVER FOR THE LIGHT CHANNEL FOR A DEVICE FOR SWITCHING-OFF A MAGNETIC CASSETTE TAPE AT THE END OF ITS RUN

This invention relates to a dust-proof cover for the light channels for switching-off a magnetic cassette tape with a transparent leader tape, more particularly for video systems.

Magnetic cassette tapes for video systems consist of an opaque magnetic tape with a transparent leader tape. The tape run is stopped after rewinding with the aid of a light, due to the change from the magnetic tape to the transparent leader tape. For this purpose, as described in DE No. 2 656 199 (U.S. Pat. No. 4,091,426), a lamp is passed between the two tape reels into a light shaft in the bottom half of the cassette. This opening is defined by a cylindrical wall with two light channels towards the narrow sides of the cassette, on which narrow sides openings are also provided. In the recorder, there are arranged (on the device side) light-receiving elements, such as photocells, in line with the light, the light channels and the openings in the cassette. On changing from the opaque tape to the transparent leader tape, the beam of light strikes the photocell and the tape is stopped. Dust may penetrate through the light shaft at the bottom of the cassette and through the laterally-arranged light channels, which are rectangular slots on the upper edge of the light shaft, and dirty the tape. The construction of a smaller video cassette system already ensures better dust-proofing, in that the tape, when in the rest position, is positioned inside a double-walled front flap. Nevertheless, dust is still admitted in the region of the light shaft. Attempts have already been made to attach tubular or pot-shaped injected parts to the light shaft in cassettes of this type. Such parts are relatively expensive and pot-shaped parts can hinder the passage of light if, for example, the pot is wrongly attached, that is with the base downwards in the light shaft.

These commercial disadvantages and the disadvantages relating to processing technology may be overcome according to the present invention by a light channel cover for the device for stopping the magnetic cassette tape at the end of its run, in that an opening is provided in the cassette housing for accommodating a light, the opening being defined by a one- or two-part shaft having slotted light channels for the passage of the beams of light towards the light receiving elements, the shaft, which is located only in the bottom part of the cassette, being provided with an encircling ledge below the light channel on which a flexible piece of film is attached which is transparent at least in the region of the light channels or the light shaft, or the shaft, which is divided in the middle and fills out the height of the interior of the cassette housing, has a circulating ledge in each of the top and bottom parts thereof, outside the region of the light channels, between which a flexible transparent piece of film covering the light channels, rests and the piece of film is supported on the inside wall of the light shaft.

Further details of the present invention are given in the description and in the sub-claims.

The present invention will be explained in more detail in the following with reference to drawings, in which.

Figure 2:
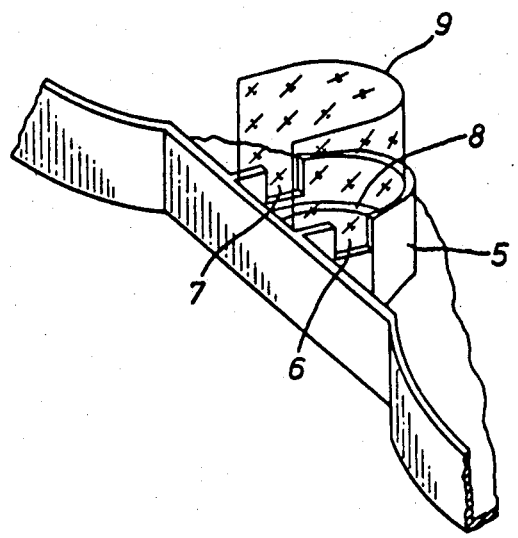
FIG. 2 is a perspective view of the light shaft in the bottom part of the cassette with the film inserted according to the invention.
Figure 3:
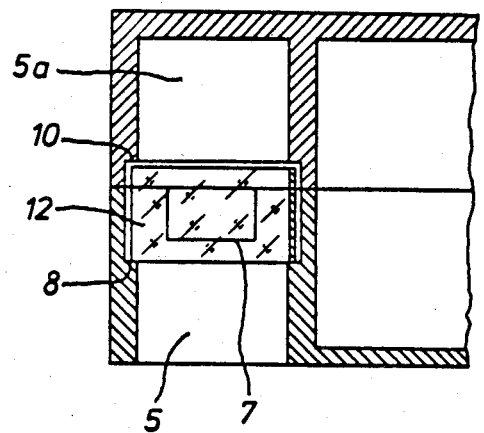
Figure 4:
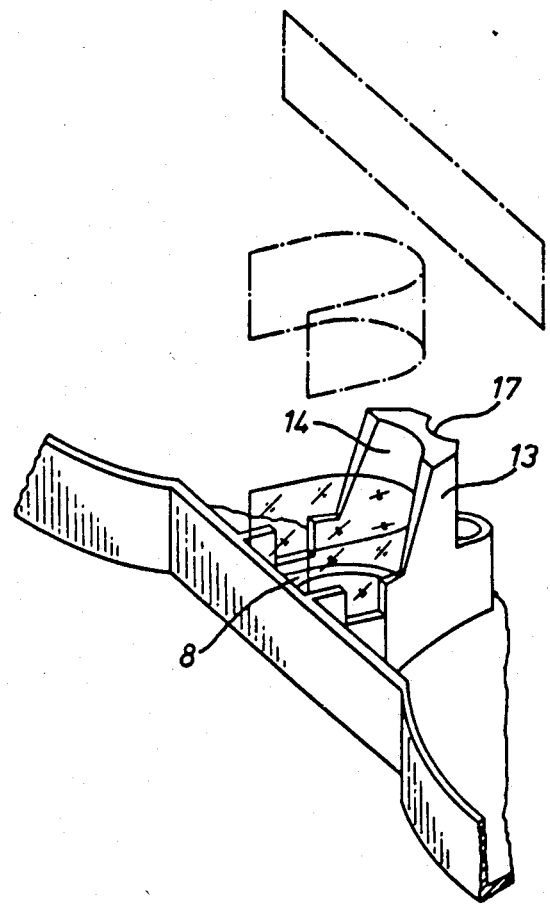
Figure 5:
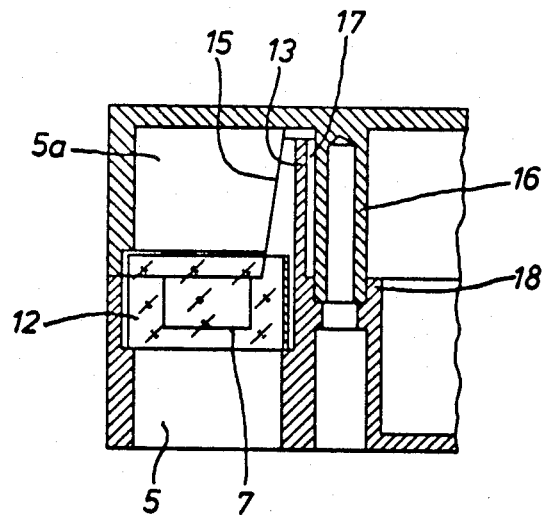

FIG. 3 a sectional view of the light shaft, which has been divided in two, with the ledges and the inserted film; and FIG. 4 is a perspective view of the light shaft according to FIG. 2 with an extended rear wall;

FIG. 5 is a sectional view of the divided light shaft according to FIGS. 3/4 with an additional screw hole.

Figure 1:
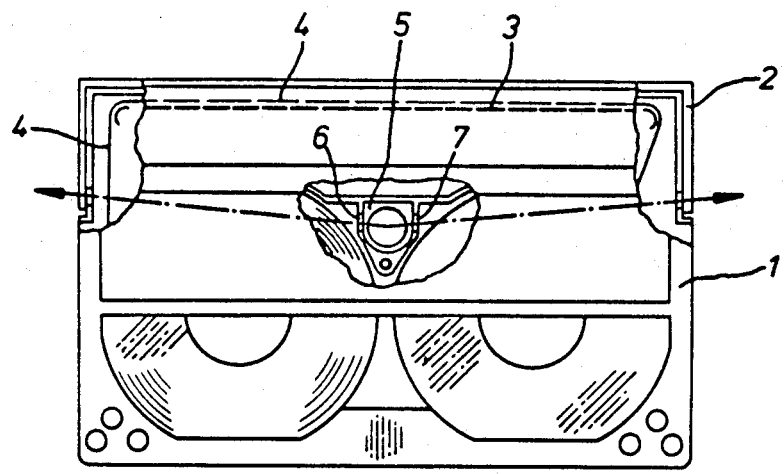
FIG. 1 is a top view of a video cassette opened-up in the region of the light shaft and the front narrow sides of the cassette.

FIG. 1 is a top view showing a video miniature cassette 1 with a double-walled front flap 2,3. The magnetic tape 4 runs between the inner and outer walls of the front flap when the cassette is not being used. The tape is thereby protected from the penetration of dust into this region from the front or the rear side. Dust can, however, still penetrate into the cassette containing the coils via the light shaft 5, the bottom of which is open, and via the light channels 6, 7 which are rectangular slots in the light shaft. The light shaft is injection moulded with the cassette housing and thus consists of the same plastics material. In order to prevent dust penetration the one-piece light shaft (in the bottom part of the cassette) is most straightforwardly provided according to the invention with a circular ledge 8 below the light channels, on which ledge a flexible rectangular piece of film 9 rests which is transparent at least in the region of the light channels (FIG. 2). The piece of film may be supported in the space between the ledge and the edge of the light shaft on the inside of the light shaft. This support gives sufficient stability for the piece of film to be able to extend vertically to the inside of the top part of the cassette and thus seal off the inside of the cassette from the light shaft. As the light may only be emitted onto the light-receiving elements via the light channels in this embodiment, it is essential, that the region of the film above the light channels is opaque.

In a further embodiment of the present invention, the light shaft is continuously divided in the middle, from the base of the bottom part of the cassette to the base of the top part of the cassette, as shown in FIG. 3 that is one half of the light shaft 5, 5a is located in the bottom of the cassette housing and the other half is in the top part. Ledges 8, 10 are provided outside the region of the light channels, between which a flexible piece of film 12 is inserted. The film is held in the light shaft of the top part of the top part of the cassette by the ledge 10. It is immaterial in this embodiment whether the light channels are only provided in the lower shaft, as shown in FIG. 2, or whether the slotted light channels are provided by cooperating slots in the lower and upper halves of the light shaft. All that matters is that they are arranged such that the beams of light emmitting through the light channels strike the photocells arranged on the side of the device. A continuously transparent film may be used in this embodiment, as the passage of the beams of light is limited to the region of the light channels by the use of a two-piece light shaft. The use of a flexible piece of film is more advantageous than small injected rolls and pots, as it may be cut to the desired length and be inserted by bending using, for example, a gripping arm. PVC, polyester and similar plastics materials may be used for the film. The thickness of the film is about 0.1 mm. Furthermore, the cost of such a piece of film is substantially cheaper.

In a further embodiment of the present invention (FIG. 4), the rear wall 13 of the lower half of the light shaft can be extended to the inside base of the top part of the cassette and, on the inside, can be in the form of an inclined flute 14. The insertion of the arched piece of film is facilitated in that it may slide in the flute up to the ledge 8. In this embodiment the upper half of the light shaft is slotted in the region of the extension of the rear wall and under cut at 15 so that the two halves complement each other (FIG. 5). As the cassette is also screwed together in various places in the region of the light shaft, a guide means for screwing can be included on the rear side thereof, owing to the construction of the light shaft according to the invention. For this purpose a screw seat 16 is moulded onto the inside bottom of the top part of the cassette, which seat 16 enters into an annular recess 18 which is moulded onto the base of the bottom part of the cassette. When the top part of the cassette is placed onto the bottom part thereof, the screw seat slides along a groove 17 on the rear side of the extended light shaft and into the recess. This construction ensures that the top and bottom parts of the cassette fit together well.

We claim:

1. A cover for the light channel of a device for switching-off at the end of its run a magnetic cassette tape with a transparent leader tape, an opening being provided in the bottom part of the cassette for accommodating a lamp, the opening being defined by a one- or two-piece light shaft with slotted light channels for the passage of the beams of light towards light-receiving elements on the device, characterised in that the light shaft 5 located only in the bottom part of the cassette is provided with an encircling ledge 8 below the light channels 6, 7, on which ledge a flexible piece of film 9 rests which is transparent at least in the region of the light channels, or that the light shaft, which is divided in the middle and fills out the height of the interior of the cassette housing, has an encircling ledge 8, 10 in each of the top and bottom parts 5, 5a thereof, outside the region of the light channels, between which a flexible transparent piece of film 12, rests and covers the light channels, the piece of film being supported on the inside wall of the light shaft.

2. A cover for a light channel according to claim 1, characterised in that the arc-shaped part of the lower half of the light shaft, oriented towards the inside of the cassette, is extended 13 almost to the base of the top part of the cassette housing and the inside of which is in the form of an inclined flute 14 and the partially-cylindrical half of the light shaft of the top part 15 is designed complementary thereto.

3. A light channel cover according to claim 2, characterised in that a screw seat 16 is attached to the base of the top part of the cassette, which seat enters into the passage 18 for the screw seat on the rear side of the lower light shaft, the rear side of the extension of the lower light shaft being in the form of a concave sliding surface for the screw seat.

* * * * *